United States Patent [19] [11] 3,716,545
Ripley [45] Feb. 13, 1973

[54] OXIDATIVE CONVERSION INCLUDING DEHYDROGENATION
[75] Inventor: Dennis L. Ripley, Bartlesville, Okla.
[73] Assignee: Phillips Petroleum Company
[22] Filed: Jan. 16, 1970
[21] Appl. No.: 4,470

Related U.S. Application Data

[63] Continuation of Ser. No. 769,428, Oct. 21, 1968, abandoned, which is a continuation-in-part of Ser. No. 693,186, Dec. 26, 1967, abandoned.

[52] U.S. Cl. ......260/290 V, 260/346.1 R, 260/347.8, 260/669 R, 260/680 E, 252/437
[51] Int. Cl.................................................C07c 5/18
[58] Field of Search ......260/683.15 E, 290 V, 347.8, 260/346.1 R, 669 R; 252/437

[56] References Cited

UNITED STATES PATENTS

| | | |
|---|---|---|
| 3,110,746 | 11/1963 | Voge et al. ...........................260/680 |
| 3,207,809 | 9/1965 | Bajars...................................260/680 |
| 3,210,436 | 10/1965 | Bajars et al...........................260/680 |
| 3,308,193 | 3/1967 | Bajars...................................260/680 |
| 3,555,105 | 1/1971 | Nolan et al...........................260/680 |
| 1,882,712 | 10/1932 | Andrussow et al...................252/437 |

*Primary Examiner*—Paul M. Coughlan, Jr.
*Attorney*—Young and Quigg

[57] ABSTRACT

Oxidative conversion of olefins and/or diolefins including the dehydrogenation of organic compounds is carried out with an iron-phosphorus-oxygen catalyst wherein the amount of phosphorus is greater than the stoichiometric amount required to react with all of the iron in the catalyst and form monophosphate ions ($PO_4^{-3}$). The activity of the phosphorus-containing catalyst can be maintained by continuous or intermittent addition of phosphorus containing compounds.

16 Claims, No Drawings

OXIDATIVE CONVERSION INCLUDING DEHYDROGENATION

This application is a continuation of copending application Ser. No. 769,428 filed Oct. 21, 1968, now abandoned, which was a continuation-in-part of copending application, Ser. No. 693,186, filed Dec. 26, 1967, now abandoned.

This invention relates to oxidative conversion including dehydrogenation. In another aspect, this invention relates to a new and improved oxidative conversion catalyst and oxidative conversion process. In still another aspect, this invention relates to maintaining the activity of an oxidative conversion catalyst. The term "oxidative conversion" as used in this application includes oxidative dehydrogenation.

Oxidative conversion processes are usually operated at the highest possible conversion consistent with a high selectivity to desired product. Such operation minimizes the required separation facilities, which is highly desirable from both an economic and operating viewpoint. The percentage conversion is defined as 100 times the moles of feedstock destroyed or otherwise converted divided by the moles of feedstock entering the process, and the percentage selectivity is defined as one hundred times the moles of desired product produced divided by the moles of feedstock destroyed or otherwise converted.

One means of evaluating the efficiency of an oxidative conversion catalyst is to add the percentage conversion and selectivity to obtain a conversion selectivity value. Under constant operating conditions, comparison of the conversion-selectivity (CSV) values for a number of catalysts enables one to select those catalysts capable of giving the best overall performance in actual operation.

One of the major shortcomings of conventional iron-phosphate oxidative conversion catalysts is that the percentage conversion and percentage selectivity are both generally quite low. This requires the working up of large amounts of material to recover oxidative converted products, and generally a sizable recycle which further increases the size of the oxidative conversion equipment.

One object of this invention is to provide an improved oxidative conversion process.

Another object of this invention is to provide an improved iron-phosphorus-oxygen oxidative conversion catalyst, the use of which results in increased conversion-selectivity values.

Still another object of this invention is to maintain the activity of the oxidative conversion catalyst.

According to this invention, I have discovered that if iron-phosphorus-oxygen catalyst systems are prepared to have phosphorus contents in excess of the stoichiometric amount required for the phosphate to react in the form of phosphate ions ($PO_4^{-3}$) with all the iron in the catalyst, improved highly active catalysts are formed. Thus, depending on the valence of the iron, my improved catalyst has a phosphorus content higher than that calculated for the corresponding iron compound containing phosphate ions. Although the invention is not to be limited thereby, it is my theory that at least part of the phosphorus is present as phosphate anions or mixtures of such anions having the empirical formulas $(P_nO_{3n+1})^{-(n+2)}$ or $[P_nO_{3n-1}(OH)_2]^{-m}$ in which $n$ is an integer in the raNge of 2 through 100. The iron within the catalyst compositions of this invention can be in the ferric, ferrous, or ferroso-ferric forms and will have phosphorus contents higher than that calculated for the compound containing only phosphate ions:

| Compound | "Normal" Phosphorus Content, wt. % |
|---|---|
| Ferric phosphate: $FePO_4$ | 20.5 |
| Ferrous phosphate: $Fe_3(PO_4)_2$ | 17.3 |
| Ferroso-ferric phosphate*: | |
| ⅓ $Fe_3(PO_4)_2$ + 2 $FePO_4$ | 19.6 |

*Considered to be derived from magnetic iron oxide ($Fe_3O_4$ or $FeO \cdot Fe_2BS3$).

Thus, the catalysts of this invention are iron-phosphorus-oxygen compositions in which the phosphorus content is generally in the range of from 1.001 to 5, preferably 1.01 to 2 times the stoichiometric amount required to react with all of said iron in the form of phosphate ($PO_4^{-3}$) ions, and the oxygen to phosphorus atomic ratio therein is in the range of from 3/1 to 3.999/1.

The catalysts of this invention can be prepared in a number of ways, preferably by the treatment of iron oxides, hydroxides, phosphates, or other salts with phosphoric acid, or by dry mixing of iron oxides or iron salts with $P_2O_5$, and the like. If desired, other methods can be used such as, for example, precipitation of iron phosphates such that the finished catalysts contain excess phosphorus. An example of this process would comprise forming a polyphosphate anion by heating alkali or ammonium dihydrogen phosphate to a temperature in the range of from about 200° to 1,000° C and then adding ferric or ferrous iron to the resulting solution.

The catalysts of this invention can be used in any conventional oxidative conversion process. Illustrative oxidative conversion processes are those that convert olefins into diolefins and oxygenated compounds such as furans, furfural, acetaldehyde, pyrans, acetic acid, acrylic acid, methyacrylic acid, acrolein, methacrolein, crotonaldehyde, crotonic acid, acetone, ethanol, and the like, and those which convert diolefins into the listed oxygenated compounds. Suitable oxidative conversion processes are those that convert at least one material selected from the group consisting of alkenes, alkadienes, cycloalkenes, cycloalkadienes, alkylpyridines, and alkylaromatics to less-saturated and/or oxygen-containing products using an elevated temperature, and a molecular oxygen-containing gas, with or without the presence of steam. It is within the scope of the invention to convert oxygen-containing compounds to compounds having a greater oxygen content. For example, methacrolein can be converted to methacrylic acid. The alkenes and alkadienes can contain from three to 10, preferably four to six, carbon atoms per molecule, inclusive, and the cycloalkenes and cycloalkadienes can contain from four to 10, preferably four to six, carbon atoms per molecule, inclusive. The alkylpyridines and alkylaromatics can contain from one to four, preferably from one to two, alkyl groups per molecule which themselves contain from one to six, preferably from two to six, carbon atoms per group, inclusive, with at least one alkyl group having at least two carbon atoms. This process is operable with alkenes and alkadienes having three to 10 carbon atoms, such as propylene, n-butenes, isobutylene, n-pentenes, isopentene, octenes, decenes, propadiene, 1,3-butadiene, isoprene, 1,3-pentadiene, 1,5-hexadiene, 1.9-decadiene, and the like. Examples of cycloalkenes and cycloalkadienes that can be used are cyclobutene, cyclopentene, cyclohexene, 3-isopentylcyclopentene, cyclopentadiene, 1,4-cyclohexadiene, and the like. Examples of alkyaromatics that can be used are ethylbenzene, propylbenzene, n-butylbenzene, isobutylbenzene, hexylbenzene, 1-methyl-2-propylbenzene, 1-butyl-3-hexylbenzene, and the like. Examples of alkylpyridines that can be used are ethylpyridine, 2-methyl-5-ethylpyridine, 2,3,4-triethylmethyl-5-ethylpyridine, 2-ethy-5-hexylpyridine, and the like.

Preferred reactions applicable to this invention are the formation of 1,3-butadiene from butenes, 1,3-pentadiene from pentenes, isoprene from isopentenes, styrene from ethylbenzene, 2-methyl-5-vinylpyridine from 2-methyl-5-ethylpyridine, furan and acetaldehyde from butenes and/or 1,3-butadiene, and furfural, acetaldehyde, and acetic acid from pentenes and/or pentadienes. It is apparent that an olefin feed, a diolefin feed, or a mixed olefin/diolefin feed resulting from at least partial recycle of the products of reaction, can be used. Although olefins and/or diolefins can be recycled to extinction, it is presently preferred to recover oxygenated products and diolefins and to recycle only the olefins.

The catalysts of this invention can be used in the form of granules, mechanically formed pellets, or any other conventional form for catalysts. The catalysts can also be employed with suitable supporting or diluting materials such as silica, alumina, boria, magnesia, titania zirconia, and combinations thereof, such as silica-alumina, boria-alumina, silica-magnesia, and the like, and similar conventional materials known in the art.

The amount of catalysts employed will vary widely depending upon the material present and the conditions but generally the amount will be that which, for the given reaction, is an effective catalytic amount to produce the desired oxidative conversion results.

The molecular oxygen-containing gas employed can be present as such or with inert diluents such as nitrogen and the like. Suitable molecular-oxygen containing gases include air, flue gases containing residual oxygen, and the like. If desired, pure or substantially pure oxygen can also be employed.

The operating conditions of the process of this invention can vary widely but will generally include a temperature in the range from about 700° to about 1,300° F, preferably from about 800 to about 1,200° F; a pressure in the range of from about 0.05 to about 250, preferably from about 0.1 to about 25 psia; and oxygen-to-gaseous organic compound feed volume ratio in the range of from about 0.1/1 to about 3/1, preferably from about 0.5/1 to about 2/1; and, if steam is used, a steam-to-organic feed volume ratio in the range of 0.1/1 to 100/1, preferably 5/1 to 20/1. The organic compound feed space rate (volumes of organic compound vapor/volume of catalyst/hour, 32° F, 14.7 psia) can be from about 50 to about 5,000, preferably from about 100 to about 2,500.

The process of this invention is ordinarily carried out by forming a mixture, preferably preheated, of organic compound feed, steam, if used, and oxygen or oxygen-containing gases, and passing this mixture over the catalyst at the desired temperature. Recycle of unconverted organic compound feed and/or steam condensate can be employed if desired; however, the conversion rates and selectivity of this invention are generally sufficiently high to eliminate necessity for recycle.

The following examples are given to further illustrate this invention. As is illustrated by the examples, there is a gradation in oxidative conversion activity as phosphorus content of the catalyst system increases from that required for monophosphate formation with the iron to above that required for the monophosphate formation with the iron. In all of the examples, conversion and percentage selectivity values were determined by gas-phase chromatography and are given in mol percent; therefore, the selectivity is a "gas-phase" value, i.e., the small amount of material remaining in the steam condensate receiver following the reactor is neglected. The values given in Examples I–IV are for an on-stream time of 1 hour. Those in Examples VIII-XI are for an on-stream time of 20 minutes.

The catalysts of the invention can be used for long periods without reactivation. However, if or when reactivation becomes necessary, it can be effected simply by stopping the flow of organic compound and allowing the flow of the other components of the feed mixture to continue for the desired reactivation period. However, a preferred method of reactivation can be accomplished by the continuous or intermittent addition of phosphorus-containing compounds to the catalysts. The process of this invention is illustrated by addition of phosphoric acid or phosphorus pentoxide, but other compounds of phosphorus such as other acids, anhydrides, phosphines, and organophosphorus compounds such those listed in 30 Chemical and Engineering News 4515ff (1952), can also be used. The phosphorus addition can be done alone, or in conjunction with intermittent catalyst regeneration with air or steam/air. The rate of addition of the phosphorus-containing compound is such that the phosphorus content of the catalyst is maintained at the same level as that of the catalyst as charged to the reactor or is adjusted to any desired content within the range recited herein. Inasmuch as any phosphorus lost from the catalyst appears in the steam condensate from the reactor, it is within the skill of the art to analyze that condensate and to calculate the amount of phosphorus compound required either to replace the phosphorus lost or to change the phosphorus content of the catalyst in the reactor. The phosphorus compound can be added as solid, liquid, or gas, or can be added as a solution or suspension in a suitable solvent or diluent such as water or an organic compound such as that being converted or any other organic compound not deleterious to the reaction being effected.

In the runs described in Examples I–IV, 2-methylbutene-2 was dehydrogenated to isoprene at feed, air, and steam space rates of 200, 1,000, and 5,000, respectively, a temperature of 1,000° F, and essentially atmospheric pressure. The catalysts used in all examples except Example VII were in the form of 20-30 mesh (U.S. Sieve) material.

EXAMPLE I

A series of catalysts was prepared by adding various amounts of concentrated aqueous phosphoric acid (85 weight percent $H_3PO_4$) to aqueous slurries of ferric oxide, drying at 240° F in air, and calcining at 1,000° F in air. Preparation details and oxidative conversion results are:

| Cat. No. | Amount Used, pbw(c) $Fe_2O_3{}^b$ | 85% $H_2O$ $H_3PO_4$ | Time, hours dry-ing | Cal-cin-ing | P, wt% (a) | Conv. | Selec | CSV |
|---|---|---|---|---|---|---|---|---|
| 1 | 30 | 40  47.6 | 40 | 22 | 20.5 | 62 | 71 | 133 |
| 2 |    | 20  54.4 |    |    | 20.7 | 73 | 82 | 155 |
| 3 |    | 40  54.4 |    |    | 21.7 | 93 | 74 | 167 |
| 4 |    | 40  61.2 |    |    | 22.5 | 75 | 84 | 159 |
| 5 |    | 40  68.0 |    |    | 23.0 | 78 | 86 | 164 |

(a) Theoretical for $FePO_4 = 20.5$ percent.
(b) Fisher ferric oxide, item 1-116, Catalog No. 64-C. This material was used in preparing catalyst 1-5.
(c) Parts by weight.

It is apparent that those catalysts containing more phosphorus than that required for formation of ferric phosphate are considerably more active than one having the theoretical phosphorus content.

EXAMPLE II

A series of catalysts was prepared in the same manner as in Example I, using ferroso-ferric oxide, usually referred to as magnetic iron oxide. This oxide has the formula $Fe_3O_4$, and is generally considered to be $FeO \cdot Fe_2O_3$. Preparation details and oxidative conversion results are:

| Cat. No. | Amount Used, pbw $Fe_2O_3{}^b$ | 85% $H_2O$ $H_3PO_4$ | Time, hours dry-ing | Cal-cin-ing | P, wt% (a) | Conv. | Selec | CSV |
|---|---|---|---|---|---|---|---|---|
| 6 | 200 | 1500 680 | (c) | 2 | ~19.6 | 64 | 86 | 150 |
| 7 | 30  | 40  54.4 | 18  | 2 | 21.8  | 83 | 83 | 166 |
| 8 | 150 | 800 680  | (d) | 3 | 25.2  | 84 | 85 | 169 |

(a) Theoretical for ⅓ $Fe_3(PO_4)_2 + 2\ FePO_4 = 19.6$ weight percent.
(b) Fisher magnetic iron oxide, Item 1-119, Catalog No. 64-C. This material was used in preparing catalysts 13-19.
(c) Washed thoroughly to remove excess phosphoric acid.
(d) Heated about 6 hours at about 200°F before calcining.

It is again apparent that those catalysts containing more phosphorus than that required for formation of ferroso-ferric phosphate are considerably more active than the one having the theoretical phosphorus content.

EXAMPLE III

Catalyst 9 was prepared in the following manner: 515.4 parts by weight of $Fe(NO_3)_3 \cdot 9H_2O$ was dissolved in 1,000 parts by weight of deionized water and acidified with 157.5 parts by weight of aqueous nitric acid (71 wt. percent $HNO_3$). To this solution was added another solution of 115 parts by weight of $NH_4H_2PO_4$ dissolved in 1,000 parts by weight of deionized water. Aqueous ammonium hydroxide (about 28 weight percent $NH_3$) was then added until the pH reached 6. The precipitate was filtered and washed 3 times with 1,000-parts by weight portions of deionized water. This filter cake was divided into 4 equal portions, 3 of which were impregnated with aqueous phosphoric acid (85 wt. percent) while in the hydrous form. All portions were calcined 2 hours at 1,000° F. The amount of 85 percent phosphoric acid added to each portion, the phosphorus content, and the oxidative conversion results are:

| catalyst No. | 85% $H_3PO_4$ Added, pbw | P,wt%(a) | conv. | selec | CSV |
|---|---|---|---|---|---|
| 9     | none | 20.5 | 31 | 96 | 127 |
| 10(b) | 17.0 | 24.7 | 61 | 95 | 156 |
| 11    | 17.0 | 24.9 | 70 | 87 | 157 |
| 12    | 59.5 | 28.5 | 79 | 85 | 164 |

(a) Theoretical for $FePO_4 = 20.5$ weight percent.
(b) Dried at 240°F for 5 hours before calcining.

It is apparent once again that those catalysts containing more phosphorus than that required for formation of ferric phosphate are considerably more active than the one having the theoretical phosphorus content.

EXAMPLE IV

Commercial ferrous phosphate was tested for dehydrogenation activity with and without added phosphoric acid. The salt was obtained from Alfa Inorganics, Inc., and was designated by catalog number Fe-164. After addition of the indicated amount of phosphoric acid, the catalysts were calcined 3 hours at 1,000° F. The amount of 85 percent $H_3PO_4$ added per 100 g of iron phosphate, the phosphorus content, and the oxidative conversion results are:

| catalyst No. | 85% $H_3PO_4$ Added, pbw | P. wt% | conv. | selec | CSV |
|---|---|---|---|---|---|
| 13 | None  | 17.3(a) | 51 | 74 | 125 |
| 14 | 22.6  | 19.3    | 77 | 82 | 159 |
| 15 | 45.2  | 22.8    | 87 | 88 | 175 |
| 16 | 90.4  | 27.1    | 58 | 97 | 155 |

(a) Theoretical for $Fe_3(PO_4)_2$.

It is again apparent that catalysts containing more phosphorus than that required for the formation of the ferric or ferrous phosphate are considerably more active than the ones having theoretical phosphorus content.

The data given in Examples I-IV indicate that phosphorus contents greater than the stoichiometric amount required for the formation of iron phosphate can be used in the process of the invention.

Examples V–VII further illustrate the improved results when utilizing this invention with catalysts prepared in various ways.

EXAMPLE V

Catalyst 17 was formed by first preparing a solution by dissolving 85 parts by weight of $FeSO_4 \cdot 7H_2O$ in 300 parts by weight of distilled water, and a second solution by dissolving 30 parts by weight of $Na_2HPO_4$ in 250 parts by weight of distilled water. The second solution was slowly added with stirring to the first solution. A precipitate formed and was aged, with stirring, in the mother liquor for 30 minutes before filtering. The filtered precipitate (ferrous phosphate) was impregnated with 9.7 parts by weight of 85 weight percent phosphoric acid and calcined at 1,000° F for 4 hours. The resulting catalyst had a phosphorus content of 22.4 weight percent.

This catalyst was tested by dehydrogenating 2-methylbutene-2 to isoprene at feed, air, and steam space rates of 200, 1,000, and 4,000, respectively, a temperature of 1,000° F, and essentially atmospheric pressure. The results are shown below:

|  | Time on stream, hr. | conversion | selectivity | CSV |
|---|---|---|---|---|
| Run 1 | ¼ | 84 | 89 | 173 |
|  | 3 ¼ | 80 | 86 | 166 |
| Run 2 | ¼ | 81 | 90 | 171 |
|  | 3 ¼ | 78 | 87 | 165 |

As illustrated, the data demonstrate excellent conversion selectivity values for this catalyst over the 3-¼ hour oxidative conversion period.

EXAMPLE VI

In this example, ferrous pyrophosphate ($Fe_2P_2O_7$) was formed and impregnated with phosphoric acid to form other active catalysts of this invention.

A first solution was formed by dissolving 85 parts by weight of $FeSO_4 \cdot 7H_2O$ in 300 parts by weight of distilled water, and a second solution was formed by dissolving 67 parts by weight of $Na_4P_2O_7 \cdot 10 H_2O$ in 1,000 parts by weight of distilled water. The second solution was added slowly to the first solution while stirring rapidly. A precipitate formed (ferrous pyrophosphate) and was filtered. One-third of the precipitate was washed with acetone and impregnated with 6.5 parts by weight of 85 weight percent phosphoric acid, and calcined 4 hours at 1,000° F to form catalyst 18 which contained 24.1 weight percent phosphorus. Two-thirds of the precipitate was impregnated, without washing, with 13.1 parts by weight of 85 weight percent phosphoric acid and calcined at 1,000° F for 4 hours to form catalyst 19 which contained 25.3 weight percent phosphorus.

Catalysts 18 and 19 were tested by dehydrogenating 2-methylbutene-2 to isoprene at feed, air, and steam space rates of 200, 1,000, and 4,000 respectively, a temperature of 1,000° F, and essentially atmospheric pressure. The results are shown below:

| Catalyst | Time on stream, hr | conversion | selectivity | CSV |
|---|---|---|---|---|
| 18 | ¼ | 76 | 89 | 165 |
| 18 | 1 | 77 | 84 | 161 |
| 19 | ¼ | 79 | 81 | 160 |
| 19 | 1 | 76 | 93 | 163 |
| 19 | 3 | 85 | 88 | 173 |

The data above clearly demonstrate that catalysts 18 and 19 have an excellent conversion-selectivity value.

EXAMPLE VII

Catalyst 20 was prepared by thoroughly admixing 0.2 mole of ferric chloride hexahydrate and 0.2 mole of monobasic ammonium phosphate. The resulting admixture was dried approximately 12 hours at 212° F and calcined by increasing the temperature to 1,250° F over a 4-hour period. The calcined material contained 21.6 weight percent phosphorus and was tested in the form of particles which had a size of 14–28 mesh (Tyler) by dehydrogenating 2-methylbutene-2 to isoprene at feed, air, and steam space rates of 200, 1,000, and 5,000, respectively, a temperature of 1,000° F and essentially atmospheric pressure. The results are shown below:

| Catalyst | Time on stream, hr | conversion | selectivity | CSV |
|---|---|---|---|---|
| 20 | 3 ¼ | 65 | 95 | 160 |
|  | ¼ (a) | 83 | 86 | 169 |

(a) The catalyst was regenerated after 3 ¼ hours on stream by simply stopping the hydrocarbon flow for 4 hours. This sample was taken ¼ hour after restarting hydrocarbon flow.

The above run indicates that catalyst 20 is a highly active oxidative conversion catalyst.

EXAMPLE VIII

A catalyst was prepared by calcining a slurry of $Fe_3O_4$ and excess $H_3PO_4$ so that the final phosphorus content was 20.3 weight percent. The catalyst was tested for oxidative conversion of 1,3-butadiene at 14.7 psia and at the indicated temperatures and gaseous hourly space rates (GHSV):

| Temp °F | GHSV 1,3-butadiene | $O_2$ | $N_2$ | steam | % Conv $C_4H_6$ | %Selectivity to Furan | %Selectivity to Acetaldehyde |
|---|---|---|---|---|---|---|---|
| 900 | 100 | 50 | 450 | 2000 | 17.66 | 42.09 | 13.57 |
| 1100 | 100 | 50 | 450 | 2000 | 54.88 | 26.30 | 8.40 |
| 1100 | 400 | 200 | 1800 | 8000 | 24.74 | 44.07 | 13.34 |
| 900 | 400 | 200 | 1800 | 8000 | 7.64 | 47.45 | 34.43 |
| 900 | 200 | 400 | 600 | 4000 | 14.70 | 51.32 | 15.37 |
| 800 | 200 | 400 | 600 | 4000 | 5.22 | 49.96 | 20.76 |
| 1000 | 200 | 400 | 600 | 4000 | 68.19 | 12.32 | 7.14 |

EXAMPLE IX

A catalyst was prepared by impregnating a precipitated ferrous phosphate with excess phosphoric acid such that the final phosphorus content was 22.4 weight percent. The catalyst was tested for oxidation conversion of 2-methylbutene-2 at 14.7 psia and at the indicated temperature and gaseous hourly space rates:

| Temp °F | GHSV 2-methyl-1-butene-2 | air | steam | Per Pass Yield, mol percent Isoprene | Oxygenated Products* |
|---|---|---|---|---|---|
| 1000 | 200 | 1000 | 4000 | 59 | 6.6 |

*Furfural, acetaldehyde and acetic acid.

EXAMPLE X

A catalyst was prepared by calcining a slurry of $Fe_3O_4$ and excess phosphoric acid such that the final phosphorus content was 24.0 weight percent. The catalyst was tested for oxidative conversion of isoprene at 14.7 psia and at the indicated temperature and gaseous hourly space rates:

| Temp °F | GHSV Isoprene | air | steam | Per Pass Yield, mol percent Furfural | Acetic acid | Acetaldehyde |
|---|---|---|---|---|---|---|
| 1000 | 200 | 1000 | 4000 | 0.11 | 0.031 | 0.04 |

EXAMPLE XI

Catalyst A — 618 grams of 85 weight percent phosphoric acid was added to a slurry of 150 grams of $Fe_3O_4$ in 800 milliliters of deionized water, the mixture was dried for 6 hours at 200° F, calcined for 3 hours at about 100° F, ground, and screened. The final phosphorus content was 25.2 weight percent.

Catalyst B — 618 grams of 85 weight percent phosphoric acid was added to a slurry of 200 grams of $Fe_3O_4$ in 1500 milliliters of deionized water, and the resulting mixture was washed thoroughly to remove excess phosphoric acid. To ¼ of the resulting material was added 34 grams of 85 weight percent phosphoric acid. The material was calcined for 2 hours at about 1,000° F, ground, and screened. The final phosphorus content was 25.5 weight percent.

Catalyst C — 45 grams of 85 weight percent phosphoric acid was added to 100 grams of ferrous phosphate, the mixture was calcined for 3 hours at about 100° F, ground, and screened. The final phosphorus content was 22.8 weight percent.

Catalyst D — sufficient 85 weight percent phosphoric acid was added to precipitated ferrous phosphate to give a final phosphorus content of 22.4 weight percent, and the mixture was calcined 3 hours at about 1,000° F, ground, and screened.

All catalysts were tested for oxidative conversion of 2-methylbutene-2, primarily to isoprene. The respective feed, air, and steam space rates used in testing catalysts A and B were 200, 1,000, and about 5,000 volumes per volume of catalyst per hour. The respective feed, air, steam space rates used in testing catalysts C and D were 400, 2,000, and about 9,000 volumes per volume of catalyst per hour. The tests were made at 1,000° F and atmospheric pressure. Conversion and selectivity to isoprene are given in the following tables.

TABLE A (Catalyst A)

| On-stream time, hours | Conversion | Selectivity |
|---|---|---|
| 1 | 84 | 85 |
| 40 | 75 | 78 |
| 55 | 57 | 76 |
| Regenerated by shutting off hydrocarbon and steam flows for one hour | | |
| ¼ | 58 | 73 |
| Cooled catalyst to 300°F and added 1 ml of 35 weight percent phosphoric acid solution. | | |
| 1 | 89 | 83 |
| 2 | 91 | 83 |
| 19 ¼ | 82 | 83 |
| 20 ¼ | 82 | 82 |

It is apparent that air regeneration did not improve catalyst activity, but that the addition of phosphoric acid did.

TABLE B (Catalyst B)

| On-stream time hours | Conversion | Selectivity |
|---|---|---|
| 17 ½ | 77 | 81 |
| 64 ½ | 57 | 73 |
| Regenerated by shutting off hydrocarbon flow for 30 minutes | | |
| ¼ | 58 | 71 |
| Added 2 ml of finely divided $P_2O_5$ to cooled catalyst | | |
| 16 | 87 | 85 |
| 36 | 75 | 88 |
| 70 | 74 | 87 |
| 104 | 66 | 85 |
| Added 2 ml of finely divided $P_2O_5$ to cooled catalyst | | |
| 16 | 81 | 84 |
| 32 ½ | 80 | 84 |

It is apparent that air/steam regeneration did not improve catalyst activity, but that addition of $P_2O_5$ did.

TABLE C (Catalyst C)

| On-stream time, hours | Conversion | Selectivity |
|---|---|---|
| 21 ¼ | 71 | 83 |
| Continuous addition of 0.33 volume per volume of catalyst per hour of 2 ½ weight per cent phosphoric acid solution was started. | | |
| 22 ¾ | 81 | 87 |
| Addition of phosphoric acid was reduced to 0.17 volume per volume of catalyst per hour. | | |
| 23 ¼ | 78 | 88 |
| 31 | 83 | 84 |
| 38 | 82 | 86 |
| 43 | 80 | 89 |

It is apparent that continuous addition of phosphoric acid can be used to maintain catalyst activity.

Catalyst D was used under a variety of conditions over a 300-hour period. Phosphoric acid was added continuously at a variety of rates during the run to maintain catalyst activity. Typical results are:

TABLE D (Catalyst D)

| On-Stream time hours | Phosphoric Acid Addition rate moles per mole of olefin feed | Conversion | Selectivity |
|---|---|---|---|
| 154 (a) | 3.42 × 10⁻³ | 73 | 94 |
| 278 | 1.71 × 10⁻³ | 67 | 96 |
| 298 (b) | 1.71 × 10⁻³ | 86 | 87 |

(a) temperature of 1025°F.
(b) temperature of 1100°F.

I claim:

1. An oxidative dehydrogenation conversion process comprising
   a. admixing at least one dehydrogenatable organic compound with molecular oxygen or molecular oxygen-containing gas, wherein said dehydrogenatable organic compound is an alkene or alkadiene of three to 10 carbon atoms per molecule, cycloalkene or cycloalkadiene of four to 10 carbon atoms per molecule, alkylpyridine or alkyl aromatic of one to four alkyl groups per molecule which alkyl groups contain up to six carbon atoms per group such that at least one alkyl group contains at least two carbon atoms, and
   b. contacting said admixture from said step (a) under oxidative dehydrogenation conversion conditions with an oxidative dehydrogenation catalyst composition consisting essentially of iron-phosphorus-oxygen wherein the phosphorus content thereof represents 1.01 to 5 times the stoichiometric amount of said phosphorus required to react with all of said iron in the form of phosphate, and wherein the oxygen:phosphorus atomic ratio in said catalyst composition ranges from about 3:1 to 3.999:1.

2. The process of claim 1 wherein said amount of phosphorus is from 1.01 to 2 times said stoichiometric amount.

3. The process of claim 1 wherein said iron is in the ferric form.

4. The process of claim 1 wherein said iron is in the ferrous form.

5. The process of claim 1 wherein said iron is in the ferroso-ferric form.

6. The process of claim 1 wherein said alkenes and alkadienes contain four to six carbon atoms per molecule, said cycloalkenes and cycloalkyldienes contain four to six carbon atoms per molecule, said alkylpyridines or said alkylaromatics contain one to two alkyl groups per molecule wherein said alkyl groups contain two to six carbon atoms per group.

7. The process of claim 1 carried out using a temperature in the range of about 700° to about 1,300° F, a pressure in the range of about 0.05 to about 250 psia, an oxygen-to-gaseous organic compound feed volume ratio in the range of about 0.01/1 to about 3/1, and an organic compound feed space rate in volumes of organic compound feed vapor per volume of catalyst per hour at 32° F and 14.7 psi in the range about 50 to about 5,000.

8. The process of claim 7 further employing steam in said admixture at a steam feed volume ratio to organic feed volume in the range of about 0.1/1 to about 100/1.

9. The process of claim 8 wherein said organic compound feed comprises isopentenes.

10. The process of claim 9 wherein said organic compound feed comprises 2-methylbutene-2.

11. The process of claim 8 wherein said organic compound feed comprises 1,3-butadiene.

12. The process of claim 9 wherein said organic compound feed comprises isoprene.

13. The process of claim 1 wherein the activity of said catalyst is maintained by the addition of at least one phosphorus-containing compound to the reaction stream.

14. The process of claim 13 wherein said phosphorus-containing compound is phosphoric acid.

15. The process of claim 13 wherein said phosphorus-containing compound is phosphorus pentoxide.

16. The process of claim 6 wherein said dehydrogenatable organic compound is said alkylpyridines or said alkylaromatics.

* * * * *